United States Patent [19]
Borne

[11] 3,852,469
[45] Dec. 3, 1974

[54] ANTIINFLAMMATORY COMPOSITIONS
[75] Inventor: Ronald F. Borne, Oxford, Miss.
[73] Assignee: The University of Mississippi, University, Miss.
[22] Filed: July 24, 1973
[21] Appl. No.: 382,280

Related U.S. Application Data
[62] Division of Ser. No. 290,404, Sept. 19, 1972, Pat. No. 3,772,377.

[52] U.S. Cl. ................................................ 424/319
[51] Int. Cl. ............................................ A61k 27/00
[58] Field of Search .................................... 424/319

[56] References Cited
UNITED STATES PATENTS
3,682,968   8/1972   Shen et al. ...................... 260/518 A Primary Examiner—Stanley J. Friedman
Attorney, Agent, or Firm—William D. Stokes

[57] ABSTRACT

Compounds having the formula:

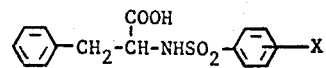

wherein X is F, Cl or Br and the non-toxic, pharmaceutically-acceptable inorganic and organic salts thereof. Antiinflammatory compositions consisting essentially of at least one of said compounds in admixture with a non-toxic, pharmaceutically-acceptable carrier. A method for reducing inflammation of the tissues in mammals comprising administering a therapeutically effective concentration of at least one of said compounds, preferably in admixture with a non-toxic pharmaceutically-acceptable carrier.

10 Claims, No Drawings

ANTIINFLAMMATORY COMPOSITIONS

This is a divisional application of U.S. application Ser. No. 290,404, filed Sept. 19, 1972, now U.S. Pat. No. 3,772,377, issued Nov. 13, 1973.

BACKGROUND OF THE INVENTION

For a considerable period of time there has been continuing interest in the discovery and development of more effective, non-steroidal, antiinflammatory agents which can be administered to mammals in therapeutically effective dosages with minimal side effects. There is also an economic need for such agents which are relatively simple to produce from readily available, non-costly reagents.

A wide variety of compounds have demonstrated antiinflammatory properties, as for example pyrazolidinediones, arylalkanoic acids, carboxylic acid amides, salicylates, and anthranilic acids. Epsilon-aminocaproic acid and L-phenylalanine have demonstrated antiinflammatory activity. α-(4-amino-3,5-diiodobenzenesulfanamido)-α-phenyl proprionic acid has been shown to be effective as a gall bladder contrast agent. However, none of the known art has taught or suggested the monohalogenated N-benzene sulfonyl derivatives of phenylalanine, their antiinflammatory properties, or their low degree of toxicity.

SUMMARY OF THE INVENTION

The invention comprises new compounds having the formula:

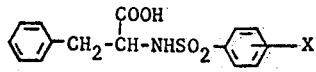

wherein X is F, Cl, or Br and the non-toxic, pharmaceutically acceptable inorganic and organic salts thereof. Preferably the halogen substituent is in the para position. The preferred halogen substituent is bromine.

The compounds have marked antiinflammatory activity when administered to mammals and can be given in effective, non-toxic doses. The compounds are preferably administered in admixture with a non-toxic, pharmaceutically-acceptable diluent carrier.

DESCRIPTION OF PREFERRED EMBODIMENTS

The compounds of the invention are mono-halogen derivatives having the formula:

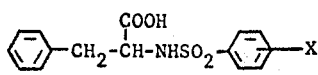

wherein X is F, Cl, or Br and the non-toxic pharamceutically acceptable inorganic and organic salts thereof. The preferred position of the halogen substituent is para, although it may also be in the ortho or meta position. The phenylalanine moiety may be employed in any of its optical isomeric forms, namely D,L-, D-, or L-. The bromine derivative is the generally preferred embodiment.

The compounds are prepared as, for example, by reacting the mono-halogen substituted benzenesulfenyl chloride with phenylalanine in dilute aqueous sodium hydroxide, acidifying the product, and then separating the resulting solid. Optimum yields are generally obtained when the pH of the basic solution of phenylalanine is maintained between about 9.5 and 10.5 during addition of the substituted benzenesulfonyl chloride.

The salts can be formed by conventional techniques by reaction of the acid form of the compounds with a therapeutically acceptable inorganic base, such as sodium, potassium, or ammonium hydroxide, or an organic base, such as an amine, e.g., methylamine, dimethylamine, triethylamine, ethanolamine, diethanolamine, triethanolamine, ethanol-diethylamine, or the like. Such salts are often preferred because of their greater solubility.

The compounds of the invention have been found to be effective as antiinflammatory agents in mammals and can be used to reduce inflammation and relieve pain in diseases such as arthritis. They can also be used to control and reduce edema.

Treatment is preferably by oral administration of the compound in a pharmaceutically acceptable carrier, which may be solid or liquid. Examples of acceptable solid carriers include, but are not limited to, starch, dextrose, sucrose, lactose, gelatin, agar stearic acid, magnesium stearate, acacia and the like. Examples of liquids include, but are not limited to, water, edible oils, such as corn or peanut oil, and the like.

When administered in solid form, the compound and diluent carrier may be in the form of tablets, capsules, powders, or lozenges prepared by standard techniques. When given as a liquid preparation, the mixture of active compound and liquid diluent carrier may be in the form of a liquid suspension administered as such or encapsulated.

The compounds have been found to be more effective as antiinflammatory agents than the standard phenylbutazone.

When employed to treat an inflammatory condition in a mammal, animal or human, the active compound is preferably administered orally in admixture with a pharmaceutically acceptable diluent carrier as described above. The compound is administered in a non-toxic dosage concentration sufficient to reduce the inflammation or the edema where present. The actual dosage administered will be determined by such generally recognized factors as the body weight of the patient, the severity of the condition being treated, the idiosyncrasies of the particular patient, and the activity of the specific compound employed. With these considerations in mind, the daily dosage for a particular patient can be readily determined by the medical practitioner in accordance with conventional techniques in the medical art.

EXAMPLE 1

1.2 moles of a solution of p-bromobenzenesulfonyl chloride in dioxane was added to a solution of D,L-phenylalanine dissolved in 2N NaOH at such a rate as to maintain the pH between 9.5 and 10.5. After addition, the resulting solution was stirred until no further pH decrease was observed. The solution was then acidified with conc. HCl to a pH of between 2 and 3 and vigorously stirred. The resulting solid N-p-bromobenzenesulfonyl-D,L-phenylalanine was collected, dried, and recrystallized from the appropriate solvent system. Analysis: calc.: % C 46.89, % H 3.67, % N 3.65; actual: % C 46.72, % H 3.60, % N 3.73.

EXAMPLE 2

The following compounds were prepared in accordance with the procedure described in Example 1:

N-p-fluorobenzenesulfonyl-D,L-phenylalanine
| Analysis: | Calc. | Actual |
|---|---|---|
| % C | 55.73 | 55.81 |
| % H | 4.33 | 4.50 |
| % N | 4.33 | 4.33 |
| % F | 5.88 | 5.89 |

N-p-chlorobenzenesulfonyl-D,L-phenylalanine
| Analysis: | Calc. | Actual |
|---|---|---|
| % C | 53.02 | 53.10 |
| % H | 4.12 | 3.94 |
| % N | 4.12 | 3.76 |
| % Cl | 10.46 | 10.78 |

N-p-bromobenzenesulfonyl-D-phenylalanine
| Analysis: | Calc. | Actual |
|---|---|---|
| % C | 46.89 | 46.71 |
| % H | 3.67 | 3.63 |
| % N | 3.65 | 3.83 |

N-p-bromobenzenesulfonyl-L-phenylalanine
| Analysis: | Calc. | Actual |
|---|---|---|
| % C | 46.89 | 47.32 |
| % H | 3.67 | 3.70 |
| % N | 3.65 | 3.50 |
| % Br | 20.79 | 21.29 |

Additional details of the preparation and physical properties of the compounds prepared in Examples 1 and 2 are given in Table I.

The antiinflammation activity of the compounds prepared in Examples 1 and 2 were tested by two techniques, one an experimental in vitro technique described by J. H. Brown et al, Proc. Soc. Exptl. Biol. Med., 125, 837 (1967) and by the standard in vivo rat paw edema technique described by C. A. Winter et al, J. Pharmacol. Exp. Ther., 141, 369 (1963).

The in vitro technique has been employed to screen antiinflammatory compounds by determining their ability to inhibit heat-induced hemolysis of red blood cells. The procedure, as described by J. H. Brown et al, supra, was followed except that fresh human blood from fasted Type O+ donors was used rather than blood from anesthetized mongrel dogs. Fresh human blood was found to give more consistent results, possibly due to a lack of stabilizing action of the anesthetic. The compounds were tested at three dose levels and compared to the standard phenylbutazone. Each value is the average of 9 to 18 separate values determined as triplicates on the blood of 3 to 5 separate subjects. The results are summarized in Table II.

Antiinflammatory activity was measured as inhibition of carrageenin-induced edema in the hind paw of the rat (Sprague Dawley, 150–200 g) according to the procedure of Winter et al, supra. Edema formation was measured 3 hours after an intraperitoneal injection of test drug suspended in saline and Tween 60 and 2.5 hours after carrageenin injection. The edema inhibition of each compound (8 rats per group) was compared with animals receiving only the vehicle and animals receiving phenylbutazone. Each value is the average percent inhibition of paw edema measured in 16 to 32 rats. The results are summarized in Table II.

The $LD_{50}$ of the more active compounds was determined by the method of J. T. Litchfield et al. J. Pharmacol. Exp. Ther., 96, 99 (1949) using four dose levels for each compound. Results are summarized in Table II.

It will be noted that the compounds of the invention were more effective than phenylbutazone in either or both the in vitro and in vivo assays. The N-p-bromobenzenesulfonyl-D,L-phenylalanine derivative showed the highest potency in both assays. This compound and N-p-bromobenzenesulfonyl-D-phenylalanine derivative also exhibited lower toxicity than phenylbutazone in a significant degree Table I

| X | Configuration | % Yield | Mp, °C | Recrystn Solvent | 22 $[\alpha]_D$ |
|---|---|---|---|---|---|
| F | D,L | 60 | 107–109 | $C_6H_6$ | — |
| Cl | D,L | 77 | 138–140 | EtOH-$H_2O$ | — |
| Br | D,L | 64 | 165–166 | EtOH-$H_2O$ | — |
| Br | D | 50 | 136–138 | EtOH-$H_2O$ | + 18.2°(EtOH) |
| Br | L | 60 | 137–139 | EtOH-$H_2O$ | − 18.9°(EtOH) |

Table II

| Compound | % Inhibition of Heat-Induced Hemolysis Conc (n)[a] | | | % Inhibition of edema Dose (n)[a] | | $LD_{50}$ (mg/kg) |
|---|---|---|---|---|---|---|
| | $10^{-3}$M | $10^{-4}$M | $10^{-5}$M | 60 mg/kg | 120 mg/kg | |
| F - D,L | 0 (9) | 0 (9) | 0 (9) | 50 (16) | 19 (16) | — |
| Cl - D,L | 65 (9) | 0 (9) | 0 (9) | 37 (32) | 31 (32) | — |
| Br - D,L | 80 (15) | 32 (15) | 5 (9) | 43 (32) | 74 (32) | 385 |
| Br - D | 79 (18) | 23 (18) | 0 (9) | 26 (16) | 32 (16) | 350 |
| Br - L | 67 (9) | 11 (9) | 11 (9) | 31 (16) | 60 (16) | — |
| Phenylbutazone | 75 (15) | 50 (15) | 11 (15) | 34 (32) | 52 (32) | 336[b] |

[a] n = No. of determinations per conc or dose level.
[b] J. Ben-Bassat, E. Peretz and F. G. Sulman, Arch. Int. Pharmacodyn. Ther., 122, 434 (1959).

I claim:
1. Antiinflammatory composition consisting essentially of a compound in an effective amount having the formula:

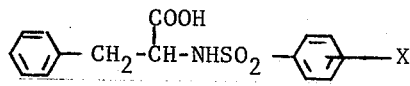

wherein X is F, Cl, or Br and the non-toxic pharmaceutically acceptable inorganic or organic salts thereof in admixture with a non-toxic, pharmaceutically acceptable carrier.

2. The composition of claim 1 wherein X is in the para position.

3. The composition of claim 1 wherein X is bromine.

4. The composition of claim 2 wherein X is bromine.

5. The composition of claim 2 wherein the carrier is solid.

6. A process for reducing inflammation in a mammal which comprises administering to said mammal the composition of claim 1, said composition containing said compound in a therapeutically-effective concentration.

7. The process of claim 6 wherein X is in the para position.

8. The process of claim 6 wherein X is bromine.

9. The process of claim 7 wherein X is bromine.

10. The process of claim 9 wherein the carrier is solid.

* * * * *